United States Patent [19]
Kochanek

[11] Patent Number: 5,755,815
[45] Date of Patent: May 26, 1998

[54] CUTTING TOOL

[75] Inventor: Dan Kochanek, Milford, Mich.

[73] Assignee: Carbon Tool & Manufacturing, Inc., Livonia, Mich.

[21] Appl. No.: 661,058

[22] Filed: Jun. 10, 1996

[51] Int. Cl.$^6$ .................................................. B23B 29/04
[52] U.S. Cl. .................................................. 407/100; 407/67
[58] Field of Search .................. 407/100, 67, 69, 407/103; 82/130

[56] References Cited

U.S. PATENT DOCUMENTS

| | | |
|---|---|---|
| 102,090 | 4/1870 | Butler . |
| 658,337 | 9/1900 | Brown . |
| 733,870 | 7/1903 | Pearson . |
| 828,632 | 8/1906 | Sprink . |
| 1,368,459 | 2/1921 | Sheuman . |
| 1,623,927 | 4/1927 | Lenhardt . |
| 1,721,378 | 7/1929 | Draeger . |
| 2,298,975 | 10/1942 | Shelburne . |
| 2,362,708 | 11/1944 | Markstrum . |
| 3,145,600 | 8/1964 | Sweet ........................................ 407/67 |
| 3,244,035 | 4/1966 | Jehle et al. . |
| 3,673,656 | 7/1972 | Gerchow . |
| 4,637,762 | 1/1987 | Acker . |
| 4,674,371 | 6/1987 | Smolders . |
| 4,940,370 | 7/1990 | Gipson . |
| 4,979,849 | 12/1990 | Kezran ........................................ 407/103 |
| 5,037,248 | 8/1991 | Heffron ........................................ 407/12 |
| 5,246,318 | 9/1993 | Merrill . |
| 5,304,018 | 4/1994 | LaVanchy et al. . |

OTHER PUBLICATIONS

Practical Ideas. Balanced Turning Tool Has Dual Opposed Infeed, Yang Keshi, Linyi, P.R. China, Apr. 1996.

*Primary Examiner*—Daniel W. Howell
*Assistant Examiner*—Mark Williams
*Attorney, Agent, or Firm*—Bliss McGlynn. P.C.

[57] ABSTRACT

A cutting tool includes a shank fixedly mounted to a tool holder of a lathe and orientated generally radially to a workpiece rotated by the lathe, a head at one end of the shank having a recess for receiving the workpiece and orientated generally axially to the workpiece, and a plurality of cutting inserts mounted to the head and disposed about the recess for cutting and removing material from the workpiece as the head moves axially along the workpiece.

20 Claims, 2 Drawing Sheets

5,755,815

1

CUTTING TOOL

BACKGROUND OF THE INVENTION

1. Field of the Invention

The present invention relates generally to cutting tools, and, more particularly, to a cutting tool for a tool holder of a lathe.

2. Description of the Related Art

It is known to provide a cutting tool for a tool holder or rest of a lathe. Typically, the cutting tool is generally rectangular in shape with a relieved cutting edge at one end for contacting a workpiece. The workpiece is typically held by a chuck or center at a head end of the lathe and by a center at a tail end of the lathe. The lathe rotates the workpiece about the centers of the lathe. An operator indexes the tool holder radially toward the workpiece to cut and remove material from the workpiece. The tool holder is then moved axially along the workpiece between the centers to remove material from the workpiece with the cutting edge of the cutting tool.

Although the above cutting tool has worked well, it suffers from the disadvantage that a relatively small amount of material may be removed in one pass along the workpiece. The cutting tool also suffers from the disadvantage that only one cutting edge is cutting the workpiece and therefore must be sharpened frequently. The cutting tool further suffers from the disadvantage that the cutting force is applied perpendicularly or radially to the workpiece. Therefore, there is a need in the art to provide a cutting tool for a tool holder of a lathe.

SUMMARY OF THE INVENTION

It is, therefore, one object of the present invention to provide a cutting tool for a tool holder of a lathe.

It is another object of the present invention to provide a cutting tool that will remove a relatively large amount of material in a single pass axially along a workpiece held in a lathe.

It is yet another object of the present invention to provide a cutting tool that provides cutting forces against centers of the lathe and not perpendicular or radially to the workpiece.

It is still another object of the present invention to provide a cutting tool for a tool holder of a lathe which can traverse a greater distance between centers of the lathe.

To achieve the foregoing objects, the present invention is a cutting tool for a tool holder of a lathe to remove material from a workpiece rotated by the lathe. The cutting tool includes a shank fixedly mounted to a tool holder and orientated generally radially to a workpiece. The cutting tool also includes a head at one end of the shank having a recess for receiving the workpiece and orientated generally axially to the workpiece. The cutting tool further includes a plurality of cutting inserts mounted to the head and disposed about the recess for cutting and removing material from the workpiece as the head moves axially along the workpiece.

One advantage of the present invention is that a new and improved cutting tool is provided for a tool holder of a lathe. Another advantage of the present invention is that the cutting tool is fixed relative to the rotating workpiece held between centers of the lathe. Yet another object of the present invention is that the cutting tool removes a relatively large amount of material from the rotating workpiece in one pass axially along the workpiece. Still another advantage of the present invention is that the cutting tool does not apply side or radial cutting pressure or forces on the workpiece but

2 to the centers of the lathe, thereby eliminating the need of a follow or steady rest. A further advantage of the present invention is that the cutting tool can traverse the total distance between centers of the lathe. Yet a further advantage of the present invention is that the cutting tool can be used on large or small diameter workpieces and cuts on both sides of the centerline of the workpiece. Still a further advantage of the present invention is that the cutting tool removes stock or material from the workpiece up to three inches in one pass or traverse of the workpiece.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
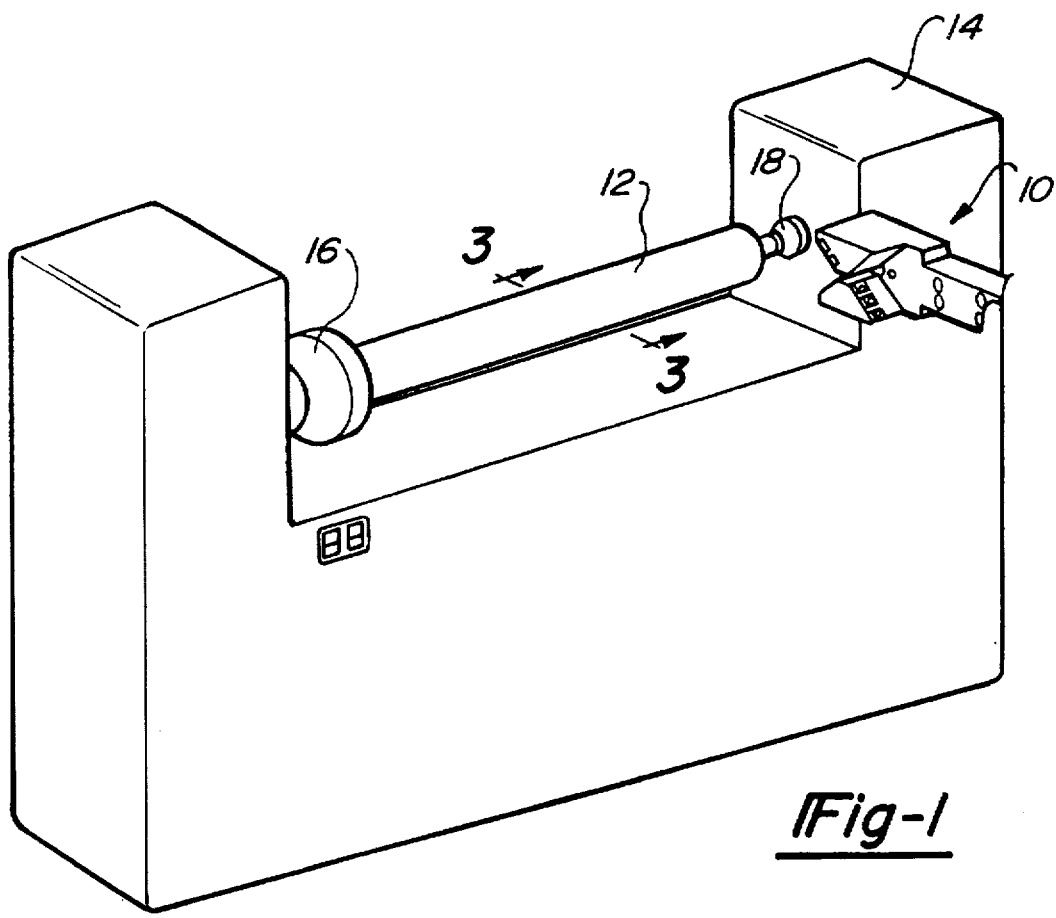
FIG. 1 is a perspective view of a cutting tool, according to the present invention, illustrated in operational relationship with a lathe.

Referring to FIG. 1, a cutting tool 10, according to the present invention, is illustrated in operational relationship with a workpiece 12 held in a lathe 14. The lathe 14 includes a headstock 16 such as a chuck which is rotated by a source (not shown) of the lathe 14. The lathe 14 also includes a tailstock 18 such as a center. The workpiece 12 is generally cylindrical in shape and extends axially. The workpiece 12 has one end held by the headstock 16 and the other end held by the tailstock 18. The lathe 14 also includes a tool holder (not shown) such as a box tool, turret or tool post for holding the cutting tool 10. It should be appreciated that the cutting tool 10 is fixed or stationary as to rotation relative to the rotating workpiece 12. It should also be appreciated that the lathe 14 is conventional and known in the art.

Referring to FIGS. 1 through 6, the cutting tool 10, according to the present invention, includes a shank 20 extending radially or longitudinally. The shank 20 is generally rectangular in shape and includes at least one, preferably a plurality of apertures 22 extending therethrough to fixedly mount the shank 20 to the tool holder by suitable means such as fasteners (not shown) extending through the apertures 22. The cutting tool 10 also includes a head 24 at one end of the shank 20. The head 24 is generally rectangular in shape and is integral or formed as one piece with the shank 20. The head 24 and shank 20 are made of a metal material such as steel.

The head 24 also has a recess 2G for receiving the workpiece 12. The recess 26 extends axially through the head 24 and radially or longitudinally into the head 24. The recess 26 has a tapered portion 28 on one radially side for initially receiving the workpiece 12 which tapers inwardly to a receiving portion 30 which receives the workpiece 12 after being cut. The receiving portion 30 has a diameter or width less than the tapered portion 28. The recess 26 also has a relief portion 32 at one axial end which tapers outwardly and through which the cut workpiece 12 extends. It should be appreciated that the relief portion 32 has a diameter greater than the receiving portion 30.

The head 24 further has a pair of opposed holder portions 34 and 36 extending axially and spaced from each other. The holder portions 34 and 36 are generally trapezoidal in shape and disposed on each vertical side of the receiving portion 30. The holder portions 34 and 36 are made of a metal material. The holder portions 34 and 36 are integral and formed as one-piece with the head 24.

The cutting tool 10 also includes a plurality of cutting inserts 38 mounted to the head 24 and disposed about the recess 26 for cutting and removing material from the workpiece 12. The holder portion 34 has a leading edge 40 with a plurality of pockets 41 therealong. The pockets 41 are generally rectangular in shape. At least two of the cutting inserts 38 are disposed in at least two of the pockets 41. The holder portion 36 has a trailing edge 42 with a plurality of pockets 43 therealong. The pockets 43 are generally rectangular in shape. At least two of the cutting inserts 38 disposed in at least two of the pockets 43. The cutting inserts 38 are generally rectangular in shape and have an aperture extending therethrough. The cutting inserts 38 are made of a carbide material. The cutting inserts 38 have a cutting edge 44 along each side thereof. The cutting inserts 38 are mounted to the holder portions 34 and 36 by suitable means such as fasteners 46 extending through the apertures in the cutting inserts 38 and threadably engaging corresponding apertures in the holder portion 34 and 36. It should be appreciated that the inserts 38 are disposed on opposite sides of a centerline of the workpiece 12.

Figure 2:
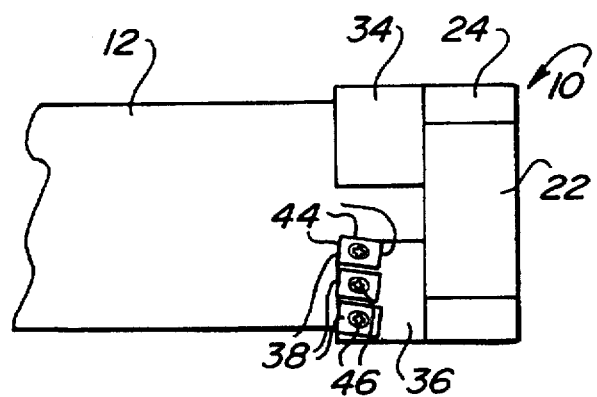
FIG. 2 is an elevational view of the cutting tool and workpiece of FIG. 1.
Figure 3:
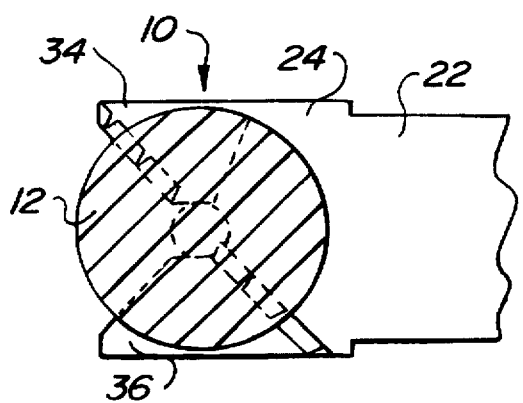
FIG. 3 is a sectional view taken along line 3—3 of FIG. 1 illustrating the cutting tool engaging the workpiece.
Figure 4:
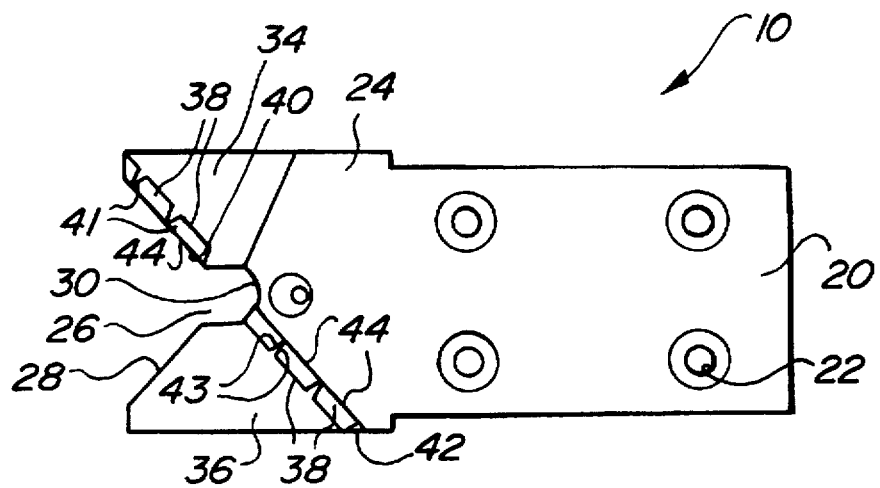
FIG. 4 is an elevational view of the cutting tool of FIG. 1.
Figure 5:
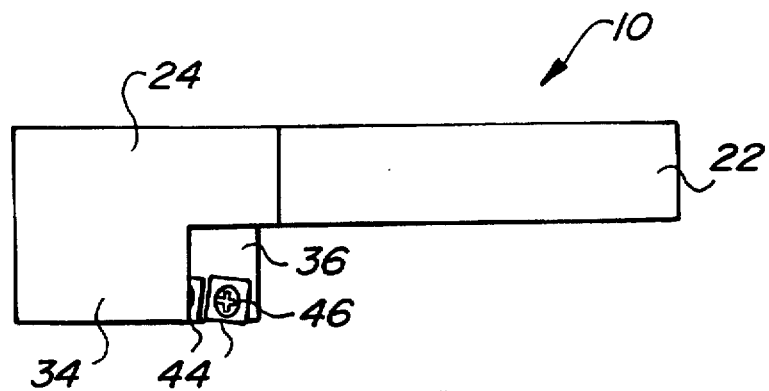
FIG. 5 is a plan view of the cutting tool of FIG. 1.
Figure 6:
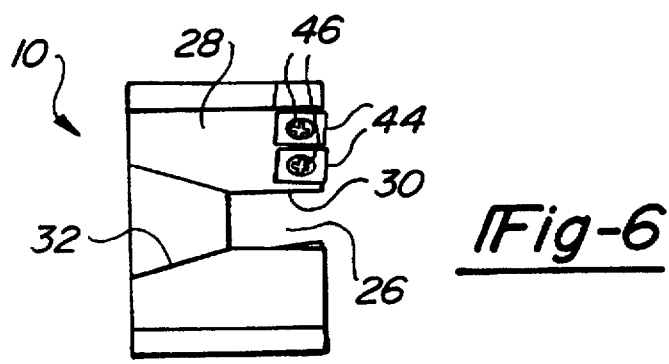
FIG. 6 is a side view of the cutting tool of FIG. 1.

In operation, the shank 20 is mounted to the tool holder of the lathe 14 and is rotationally fixed or stationary relative to the workpiece 12 which is rotated by the headstock 16 and disposed between the headstock 16 and tailstock 18. The cutting tool 10 is moved radially toward the workpiece 12 by the tool holder such that the tapered portion 28 receives the workpiece 12 as illustrated in FIG. 2. The cutting inserts 38 cut and remove material from the workpiece 12 as it is moved radially inwardly until the diameter of the workpiece 12 is received in the receiving portion 30 and the cutting tool 10 passes over a center support at the tailstock 18 as illustrated in FIG. 3. The cutting tool 10 is moved axially toward the headstock 16 and face turns to produce the diameter of a shaft of the workpiece 12 by cutting on both sides of a centerline of the workpiece 12 at the same time. The cutting tool 10 displaces chips or removed material and can travel the full distance between the headstock 16 and tailstock 18. The cutting inserts 38 cut and remove material from the workpiece 12 extends through the relief portion 32. It should be appreciated that the cutting inserts 38 may be removed and indexed to the next cutting edge 44 if desired.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cutting tool for a tool holder of a lathe to remove material from a workpiece rotated by the lathe comprising:

a shank fixedly mounted to the tool holder and orientated generally radially to a longitudinal axis of the workpiece;

a head at one end of said shank having a recess for receiving the workpiece and orientated generally parallel to the longitudinal axis of the workpiece; and a plurality of cutting inserts mounted to and extending from said head generally parallel to and on opposite sides of the longitudinal axis of the workpiece and disposed about said recess for cutting and removing material from a face of the workpiece on both sides of the longitudinal axis of the workpiece as said head moves generally parallel to the longitudinal axis of the workpiece.

2. A cutting tool as set forth in claim 1 wherein said shank extends radially relative to the longitudinal axis of the workpiece and has at least one aperture extending axially therethrough.

3. A cutting tool as set forth in claim 1 wherein said shank is generally rectangular in shape.

4. A cutting tool as set forth in claim 1 wherein said head and said shank are integral and formed as one-piece.

5. A cutting tool as set forth in claim 1 wherein said recess extends axially through said head and radially into said head.

6. A cutting tool as set forth in claim 1 wherein said cutting inserts are generally rectangular in shape and have a cutting edge along each side thereof.

7. A cutting tool as set forth in claim 1 including fasteners for mounting said cutting inserts to said head.

a plurality of cutting inserts mounted to said head and disposed about said recess for cutting and removing material from the workpiece as said head moves axially along the workpiece; and one of said holder portions has a leading edge with at least two of said cutting inserts disposed therealong and the other of said holder portions has a trailing edge with at least two of said cutting inserts disposed therealong.

8. A cutting tool for a tool holder of a lathe to remove material from a workpiece rotated by the lathe comprising:

a shank fixedly mounted to the tool holder and orientated generally radially to a longitudinal axis of the workpiece;

a head at one end of said shank having a recess for receiving the workpiece and orientated generally parallel to the longitudinal axis of the workpiece;

a plurality of cutting inserts mounted to said head and disposed about said recess for cutting and removing material from the workpiece as said head moves generally parallel to the longitudinal axis of the workpiece; and said recess having a tapered portion on one radial side and a receiving portion at one end of said tapered portion.

9. A cutting tool for a tool holder of a lathe to remove material from a workpiece rotated by the lathe comprising:

a shank fixedly mounted to the tool holder and orientated generally radially to a longitudinal axis of the workpiece;

a head at one end of said shank having a recess for receiving the workpiece and orientated generally parallel to the longitudinal axis of the workpiece;

a plurality of cutting inserts mounted to and extending from said head generally parallel to the longitudinal axis of the workpiece and disposed about said recess for cutting and removing material from the workpiece as said head moves generally parallel to the longitudinal axis of the workpiece; and wherein said recess has a relief portion at one end tapered outwardly.

10. A cutting tool for a tool holder of a lathe to remove material from a workpiece rotated by the lathe comprising:

- a shank fixedly mounted to the tool holder and orientated generally radially to a longitudinal axis of the workpiece;
- a head at one end of said shank having a recess for receiving the workpiece and orientated generally parallel to the longitudinal axis of the workpiece;
- a plurality of cutting inserts mounted to said head and disposed about said recess for cuffing and removing material from the workpiece as said head moves generally parallel to the longitudinal axis of the workpiece.
- said head having a pair of opposed holder portions extending axially and spaced from each other.

11. A cutting tool as set forth in claim 10 wherein said holder portions are generally trapezoidal in shape.

12. A cutting tool as set forth in claim 10 wherein said holder portions are integral and formed as one-piece with said head.

13. A cutting tool as set forth in claim 10 wherein one of said holder portions has a leading edge with a plurality of leading pockets and at least two of said cutting inserts being disposed in said leading pockets and the other of said holder portions has a trailing edge with a plurality of trailing pockets and at least two of said cutting inserts being disposed in said trailing pockets.

14. A cutting tool for a tool holder of a lathe to remove material from a workpiece rotated by the lathe comprising:

- a shank fixedly mounted to the tool holder and orientated generally radially to a longitudinal axis of the workpiece;
- a head to one end of said shank having a pair of opposed holder portions spaced from each other and forming a recess for receiving the workpiece and orientated generally parallel to the longitudinal axis of the workpiece; and
- a plurality of cutting inserts mounted to said head and disposed about said recess for cutting and removing material from the workpiece as said head moves generally parallel to the longitudinal axis of the workpiece; and
- one of said holder portions has a leading edge with at least two of said cutting inserts disposed therealong and the other of said holder portions has a trailing edge with at least two of said cutting inserts disposed therealong.

15. A cutting tool as set forth in claim 14 wherein said recess extends axially through said head and radially into said head.

16. A cutting tool as set forth in claim 15 wherein said recess has a tapered portion on one radial side and a receiving portion at one end of said tapered portion.

17. A cutting tool as set forth in claim 16 wherein said recess has a relief portion at one axial end tapered outwardly.

18. A cutting tool as set forth in claim 14 wherein said holder portions are generally trapezoidal in shape.

19. A cutting tool as set forth in claim 14 wherein said shank extends radially and has at least one aperture axially therethrough.

20. A cutting tool for a tool holder of a lathe to remove material from a workpiece rotated by the lathe comprising:

- a shank fixedly mounted to the tool holder and orientated generally radially to a longitudinal axis of the workpiece;
- a head at one end of said shank having a pair of opposed holder portions and spaced from each other and forming a recess for receiving the workpiece and orientated generally parallel to the longitudinal axis of the workpiece;
- said recess extends axially through said head and radially into said head having a tapered portion on one radial side and a receiving portion at one end of said tapered portion and a relief portion at one axial end tapered outwardly; and
- one of said holder portions has a leading edge with a plurality of leading pockets and at least two of said cutting inserts disposed in said leading pockets and the other of said holder portions has a trailing edge with a plurality of trailing pockets and at least two of said cutting inserts disposed in said trailing pockets.

* * * * *